Patented Jan. 24, 1939

2,144,983

UNITED STATES PATENT OFFICE 2,144,983

METHOD OF MANUFACTURING KOJI NUTRIMENT

Matajiro Kawata, Den-en Chofu, Omori-ku, Tokyo, Japan, assignor to Kabushiki Kaisha Wakamoto Honpo Eiyo To Ikuji No Kai, Tokyo, Japan, a corporation of Japan No Drawing. Application December 9, 1936, Serial No. 115,025

4 Claims. (Cl. 99—97)

The present invention relates to a method of manufacturing a flavorous nutriment from the yeast which has absorbed effective ingredients such as the rice embryo bud or bran, which consists in adding yeast or the liquor extracted from yeast or a material mixed with them to the constituents of the membrane of rice such as rice bran or embryo so as to breed Aspergillus oryzae; adding to the liquor extracted from the above a dilute acid, the liquor obtained by further extracting the residue with a dilute alkali so as to make it weakly acidic; fermenting it by the addition of yeast and concentrating the same into a suitable water form by evaporation at a low temperature; then causing it to be adsorbed by powdered embryo or similarly-effective powder and again inoculating and breeding Aspergillus oryzae spore upon it; drying it at a low temperature and finally pulverizing the product. The object of this invention is to obtain a nutriment by easy and simple means which is not only rich in vitamins, nuclein, phosphorus-containing nitrogen compounds and soluble nutritious substances, but also is flavorous and accordingly is nice to use and can stand long preservation.

Now, the yeast contains nutritious materials such as nuclein and lecithin together with vitamins such as double compound of vitamin B and ergosterin (the origin of vitamin D).

Also, when observed from the pharmacological point of view, it contains glycokinin (glucokinin) which has the power of reducing blood sugar, a blood-pressure reducing substance, an antidote for a liver toxin, glutathione which has great significance in the oxidation or reduction in the vital body, a blood-making substance, purinbase which promotes urination, a counteracting agent for liver oil toxin, glycogen effective against night-sweating and innumerable other effective ingredients.

Further, besides said glycokinin (glucokinin), auxin and other hormone substances, it contains amylase, protease, lipase and many kinds of enzymes. Especially, owing to the co-enzyme contained therein, the actions of these various enzymes are considerably strengthened to assist digestion.

The so-called "koji" is made by breeding Aspergillus oryzae in cereals contains vitamin $B_2$ and various kinds of enzymes, especially a very large quantity of diastase which aids digestion. The rice embryo and rice bran and wheat bran are the richest but most inexpensive sources of supply of vitamins $B_1$ and E. They are rich in phosphorus-containing nitrogen compounds, and it has been made clear by the recent study that if Aspergillus oryzae is bred in them, they not only contain these effective ingredients, but at the same time form various kinds of enzymes.

Now, according to the present invention which is based upon the above observation, the most ideal nutriment is produced by the combination of yeast and the so-called "koji" made by breeding Aspergillus oryzae. It is widely different from the known simple nutriment or enzyme drug.

Vitamins and enzymes are both unstable substances and accordingly are very easily destroyed when subjected to various chemical operations. Thus, great care must be taken in the manufacture of yeast. Especially, their combination with "koji" is exceedingly difficult so that it has hitherto been neglected by all. Further, it is not merely a very difficult thing to breed Aspergillus oryzae, etc., in the rice embryo and bran, but the presence of a stimulative substance makes the product unfit for use or reduces the power of various kinds of enzymes, for example, diastase, to about one third. In the present method, Aspergillus oryzae is bred by the addition of the rice embryo or bran and yeast or the liquor extracted from yeast or their mixture, thus considerably mitigating the stimulative quality of the rice bran and also aiding the breeding of Aspergillus oryzae. Moreover, the time necessary for the development of mycelium is shortened to nearly the half of that required by the ordinary process and yet the saccharification of the product has Lintner's value increased from the normal 60-80 to 100-150. This contains effective ingredients soluble in a dilute acid and a dilute alkali. Therefore, a substance to be easily destroyed by alkali (for example, vitamin $B_1$) is first extracted with a dilute acid, after which the residue is extracted with a dilute alkali, and the liquor obtained by mixing these two which contains a large quantity of vitamin and soluble nutritious substances is regulated to be slightly acidic and then is fermented by the addition of yeast, which adsorbs and accumulates in it the vitamin, carbohydrate, mineral matters, etc., contained in the liquor. Next, it is concentrated by evaporation at a low temperature and after the addition of the embryo, etc., and also yeast extract or bonito extract, has Aspergillus oryzae inoculated thereupon and bred, so that it may hold a large quantity of yeast. At the same time, the bad odor peculiar to the known yeast is lost, and a flavorous product having a great nutritive value is obtained.

The following is an example of carrying this invention into practice:—

Add 3-5% of yeast or the equivalent quantity of yeast extract to rice embryo, breed *Aspergillus oryzae* by the ordinary process and fill it in many extracting vats arranged in series. Add dilute acid solution, for instance, 0.2% hydrochloric acid solution to the first vat. Then, after regulating the acidity of the solution which has left the vat to 0.2% by the further addition of hydrochloric acid, introduce it into the next vat. Thus, pass it through all the vats in succession till the solution from the last one is gathered in a neutralizing vat. Pass dilute alkali solution, for example, 0.2% caustic soda solution, through a row of many extracting vats filled with the residue left after all soluble substances are thus separated with hydrochloric acid and introduce the solution which has left the last vat, into a neutralizing vat where the solutions extracted with acid and alkali respectively are mixed together and neutralized adjusted to weak acidity. Add compressed yeast thereto and breed it at the room temperature. After concentrating the same by evaporation below 40° C., add the embryo, etc., steamed for a short hour in the quantity equivalent to 5% of the embryo originally employed. Then, adding 10-20% of yeast extract and again inoculating *Aspergillus oryzae*, breed it by the ordinary process and dry it at a low temperature.

I claim:

1. A method for manufacturing a nutriment which comprises mixing rice membrane and yeast material, propagating *Aspergillus oryzae* upon the mixture, until koji forms, extracting said koji with dilute hydrochloric acid, separating the residue from the liquid, further extracting the residue with dilute alkali, mixing said acid and alkaline liquids in such proportions as to yield a slightly acid liquid, subjecting said liquid to yeast fermentation, then concentrating said liquid and absorbing it in rice membranes, propagating *Aspergillus oryzae* thereupon until the mixture becomes koji, then drying and pulverizing said koji.

2. The process of claim 1 in which the yeast material is the yeast organism.

3. The process of claim 1 in which the yeast material is yeast extract.

4. A method for manufacturing a nutriment which consists in mixing rice bran with liquor extracted from yeast, propagating *Aspergillus oryzae* upon the mixture until koji is obtained, then extracting said koji with dilute hydrochloric acid, separating the resulting liquid from the residue, extracting the residue with dilute alkali solution, mixing said acid and alkaline liquors in proportions to produce a slightly acid liquor, submitting said liquor to yeast fermentation, absorbing it in rice bran, propagating *Aspergillus oryzae* upon the mixture, until koji forms, then drying and pulverizing it, all heating steps above recited being only to a temperature so low as to maintain the contained enzymes and vitamins in full vitality.

MATAJIRO KAWATA.